United States Patent
Ishii

(10) Patent No.: US 8,935,103 B2
(45) Date of Patent: Jan. 13, 2015

(54) METHOD AND SYSTEM FOR GOLF BALL FITTING ANALYSIS

(75) Inventor: Hideyuki Ishii, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 720 days.

(21) Appl. No.: 12/836,815

(22) Filed: Jul. 15, 2010

(65) Prior Publication Data

US 2012/0016599 A1 Jan. 19, 2012

(51) Int. Cl.
*G06F 19/00* (2011.01)
*G06F 3/042* (2006.01)
*G06F 3/041* (2006.01)
*A63B 47/00* (2006.01)
*A63B 24/00* (2006.01)
*A63B 69/36* (2006.01)
*A63B 59/00* (2006.01)
*A63B 71/02* (2006.01)

(52) U.S. Cl.
CPC .......... *A63B 47/008* (2013.01); *A63B 2220/56* (2013.01); *A63B 2024/004* (2013.01); *A63B 2220/30* (2013.01); *A63B 2220/72* (2013.01); *A63B 2220/805* (2013.01); *A63B 69/3614* (2013.01); *G06F 3/0421* (2013.01); *A63B 2024/0031* (2013.01); *A63B 2024/0028* (2013.01); *A63B 2220/801* (2013.01); *A63B 2220/35* (2013.01); *A63B 2024/0043* (2013.01); *A63B 2225/02* (2013.01); *A63B 2220/20* (2013.01); *A63B 2024/0046* (2013.01); *A63B 2220/05* (2013.01); *A63B 59/0074* (2013.01); *A63B 2024/0034* (2013.01); *A63B 2024/0009* (2013.01); *A63B 69/3623* (2013.01); *A63B 2024/0056* (2013.01); *A63B 2220/806* (2013.01); *A63B 2220/70* (2013.01); *G06F 3/0414* (2013.01); *A63B 2220/89* (2013.01); *A63B 2220/802* (2013.01); *A63B 2225/20* (2013.01); *A63B 2220/10* (2013.01); *A63B 2220/807* (2013.01); *A63B 71/02* (2013.01); *A63B 24/0021* (2013.01); *A63B 2225/50* (2013.01); *A63B 69/3658* (2013.01); *A63B 2209/10* (2013.01); *A63B 2220/808* (2013.01); *A63B 2220/16* (2013.01); *A63B 2220/75* (2013.01)
USPC .......................................... 702/33; 73/65.03

(58) Field of Classification Search
CPC ....................................................... G01H 1/003
USPC ................................................ 702/33; 901/2
See application file for complete search history.

(56) References Cited

U.S. PATENT DOCUMENTS 3,508,440 A 4/1970 Murphy
3,814,438 A * 6/1974 Baron et al. ................... 473/192

(Continued)

FOREIGN PATENT DOCUMENTS

CN ZL201120249746.8 9/2012
EP 2272570 1/2011

(Continued)

OTHER PUBLICATIONS

European Search Report dated Dec. 22, 2011 in European Patent Application No. EP11173745.

(Continued)

*Primary Examiner* — Patrick Assouad
*Assistant Examiner* — Haidong Zhang
(74) *Attorney, Agent, or Firm* — Plumsea Law Group, LLC

(57) ABSTRACT

The present invention provides golf ball recommendations correlating to a golfer's swing parameters determined by comparing the flight characteristics of a golf ball driven by the golfer with a database of flight characteristics of golf balls associated with particular swing parameters. The swing parameters in the database may be correlated with golf ball flight characteristics determined using empirical tests.

16 Claims, 6 Drawing Sheets

(56) References Cited

U.S. PATENT DOCUMENTS

| | | |
|---|---|---|
| 4,063,259 A | 12/1977 | Lynch et al. |
| 4,177,994 A | 12/1979 | Lindquist |
| 4,375,887 A | 3/1983 | Lynch et al. |
| 4,770,527 A * | 9/1988 | Park .................... 356/28 |
| 5,056,791 A | 10/1991 | Poillon et al. |
| 5,221,082 A | 6/1993 | Curshod |
| 5,390,927 A * | 2/1995 | Angelos .................... 473/155 |
| 5,437,457 A * | 8/1995 | Curchod .................... 473/199 |
| 5,846,139 A * | 12/1998 | Bair et al. .................... 473/156 |
| 5,863,255 A | 1/1999 | Mack |
| 6,371,862 B1 | 4/2002 | Reda |
| 6,537,076 B2 | 3/2003 | McNitt et al. |
| 6,595,863 B2 | 7/2003 | Chamberlain et al. |
| 6,702,692 B1 | 3/2004 | Smith |
| 7,395,696 B2 | 7/2008 | Bissonnette et al. |
| 7,908,907 B1 * | 3/2011 | Nelson et al. .................... 73/65.03 |
| 2002/0152796 A1 | 10/2002 | Katayama |
| 2004/0006442 A1 | 1/2004 | Boehm |
| 2005/0107179 A1 | 5/2005 | Munshi |
| 2005/0268704 A1 | 12/2005 | Bissonnette et al. |
| 2006/0063574 A1 | 3/2006 | Richardson et al. |
| 2006/0189414 A1 | 8/2006 | Voges et al. |
| 2007/0021242 A1 | 1/2007 | Krickler |
| 2007/0244667 A1 | 10/2007 | Ligotti, III et al. |
| 2007/0298896 A1 | 12/2007 | Nusbaum et al. |
| 2008/0021651 A1 | 1/2008 | Seeley et al. |
| 2009/0207131 A1 | 8/2009 | Togami et al. |
| 2009/0325721 A1 | 12/2009 | Esayian et al. |
| 2011/0070961 A1 * | 3/2011 | Nicora .................... 473/156 |
| 2011/0319199 A1 * | 12/2011 | Voges et al. .................... 473/409 |

FOREIGN PATENT DOCUMENTS

| | | |
|---|---|---|
| EP | 2364752 | 9/2011 |
| EP | 2409735 | 1/2012 |
| JP | S55116264 | 9/1980 |
| JP | 57-103656 | 6/1982 |
| JP | S6186603 | 5/1986 |
| JP | 6-71006 | 3/1994 |
| JP | 6-335548 | 6/1994 |
| JP | 09-215808 | 8/1997 |
| JP | H1119262 | 1/1999 |
| JP | 2002000787 | 1/2002 |
| JP | 2002315860 | 10/2002 |
| JP | 2007038000 | 2/2007 |
| TW | 458795 | 10/2001 |
| TW | 201211814 | 3/2012 |
| WO | 2009039367 | 3/2009 |

OTHER PUBLICATIONS

Notification of Grant of Patent Right for Utiltiy Model for Chinese Utility Model Patent Application No. 201120249746.8, issued on May 24, 2012.

Communication pursuant to Rule 70(2) and 70a(2) EPC and reference to Rule 39(1) EPC for European Patent Application No. EP11173745.8, mailed on Jan. 30, 2012.

Response to Official Communication mailed Jan. 30, 2012 for EP Patent Application No. EP11173745.8, as filed on Jun. 20, 2012.

Communication under Rule 71(3) EPC for European Patent Application No. EP11173745.8, issued on Dec. 5, 2012.

Office Action issued May 28, 2013 for Japanese Patent Application No. 2011-153619 and the English translation thereof.

Response to Office Action issued May 28, 2013 for Japanese Patent Application No. 2011-153619 as filed on Sep. 27, 2013 and the English translation thereof.

Notification of First Office Action issued Sep. 18, 2013 for Chinese Invention Patent Application No. 201110198165.0 and the English translation thereof.

English Translation of Examiner's Decision of Rejection for Japanese Application No. 2011-153619, issued Jan. 24, 2014.

English Translation of Official Letter for Taiwanese Patent Application No. 100116465, issued Feb. 17, 2014.

English Translation of Office Action issued Apr., 30, 2014, for Chinese Application No. 201110198165.

* cited by examiner

GOLF BALL CATEGORIZATION / GRADING

|  | Difficult |  |  |  | Easy |
|---|---|---|---|---|---|
| Parameter | 1 | 2 | 3 | 4 | 5 |
| Driver Spin | Easy to Spin |  |  |  | Difficult to Spin |
| Consistency of Swing | Requires Consistency |  |  |  | More Forgiving |
| Side Spin | Easy to Spin |  |  |  | Difficult to Spin |
| Attack Angle | Narrow Range |  |  |  | Tolerates Broader Range |
| Launch Angle | Narrow Range |  |  |  | Tolerates Broader Range |

BALL A

BALL B

BALL C

BALL D

METHOD AND SYSTEM FOR GOLF BALL FITTING ANALYSIS

BACKGROUND

The present invention relates to a method and system for golf ball fitting analysis to match golf balls to a golfer's game and proficiency.

With advances in golf ball design, and increasing awareness and proliferation of golf equipment designed for particular levels of play, there has been increased interest in matching a golfer with an appropriate golf ball. While golf club fitting has become well known and a routine service of golf pro shops, golf ball fitting is a newer process with much still being done simply by a series of questions posed to the golfer. The questions are generally about a golfer's average score, handicap, their goals for their game, and their wishes for the oft times contradictory goals of control, distance, and workability of the golf ball. In some golf ball fitting surveys, there is consideration given to the playing conditions such as green speeds, firmness of the turf, altitude, climate and atmospheric conditions on a given course. After the answers are elicited, a pro or fitter will consider the necessary compromises and recommend a golf ball for the player. This question and answer process is purely subjective and does not take much measurable criteria into account. A golfer's stated average score or handicap is simply accepted. It does not take into account the fact that golfers may subconsciously provide answers regarding distance, control, how often they tend to slice the ball, etc. that they wish were true rather than those that are true.

Recent developments in golf ball fitting have addressed some of the shortcomings of a purely subjective question and answer process by having a golfer take swings at a ball while being monitored by launch monitors, video devices and other measuring devices. The measurements generally taken range among the club head speed, ball speed, launch angle, attack angle, backspin, sidespin and total distance. In existing ball fitting methods, these measurements are considered within a framework of assumptions. It is known that when a golf ball is hit by a driver, fairway metal or long iron, the ball is deformed upon impact, and that large deformation means less spin and longer carries. An example of an assumption of a conventional ball fitting method is that distance is maximized when a ball is selected to provide an appropriate amount of deformation for one's specific golf swing. In this existing ball fitting method, the golf balls are categorized primarily according to spin and feel, and the measurements and survey questions are used to recommend a golf ball using this type of two-dimensional ball profile. The existing ball fitting methods require a degree of knowledge and subjective judgment of the tester in employing the measured parameters to arrive at a recommendation.

In both the survey approach and the measurement and testing approach, a wide range of parameters and inputs would be preferred. However, in the context of a ball fitting session, a challenge is to gather a large amount of information in a relatively short amount of time without inconveniencing the golfer. Another challenge is to present the correlation between the information gathered and the recommended golf ball(s) in an easily understood way.

There is a need in the art for a method and system for golf ball fitting analysis that addresses the shortcomings of the prior art discussed above. Specifically, a method that will eliminate the need for a tester to have deep knowledge or experience in order to process a golf ball fitting session.

SUMMARY

The invention provides a system and method that uses the flight pattern of a ball hit by a human golfer to determine various swing parameters. In sum, the present invention may provide golf ball recommendations correlating to ball fit values calculated using objective criteria obtained by correlating a grid position of a ball hit toward a grid to one or more flight characteristics of the ball. In turn, this information is correlated to one of more swing characteristics of the golfer, such as in a computerized system or with a table. The grid information may be directly or indirectly transmitted to the golf fitting system, including but not limited to direct input from a user via an input/output device, transmission of information directly from the golf ball using wireless communications, directly from the grid using wireless or wireline communications, or from a system associated with the grid using wireless or wireline communications.

One aspect is a method for determining a golf ball fit value, the method comprising the steps of: having a golfer drive a golf ball into a grid with a golf club; determining flight characteristics of the golf ball driven by the golfer; using the flight characteristics of the golf ball driven by the golfer to estimate swing parameters of the golfer; and using the estimated swing parameters of the golfer to fit a golf ball to the golfer's swing, wherein swing parameters include one or more of club head speed, launch angle, and attack angle, and flight characteristics of the golf ball include one or more of ball speed, ball spin, ball trajectory, and total distance.

Another aspect is a method of compiling a database for a system for fitting a golfer with a golf ball, wherein the database is compiled by the steps of: having a robot swing a golf club to drive a golf ball into a grid in a variety of combinations of swing parameters; and storing information on flight characteristics of the golf ball corresponding to the variety of combinations of golf swing parameters, wherein the flight characteristics of a golf ball comprise one or more of ball speed, ball spin, ball trajectory, and total distance, and wherein the parameters of a golfer's swing comprise one or more of club head speed, launch angle, and attack angle.

Another aspect is a golf ball fitting analysis system for a computer comprising: a database of stored golf ball profiles using at least one scale value; an input device for inputting objective data regarding a golf ball's flight characteristics; a stored lookup table of objective data regarding a golf ball's flight characteristics; an input device for inputting objective criteria regarding a golfer's swing mechanics; and a device for determining an objective ball fit value on the scale representing objective criteria.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention.

Moreover, in the figures, like reference numerals designate corresponding parts throughout the different views.

DETAILED DESCRIPTION

Figures 1, 2:
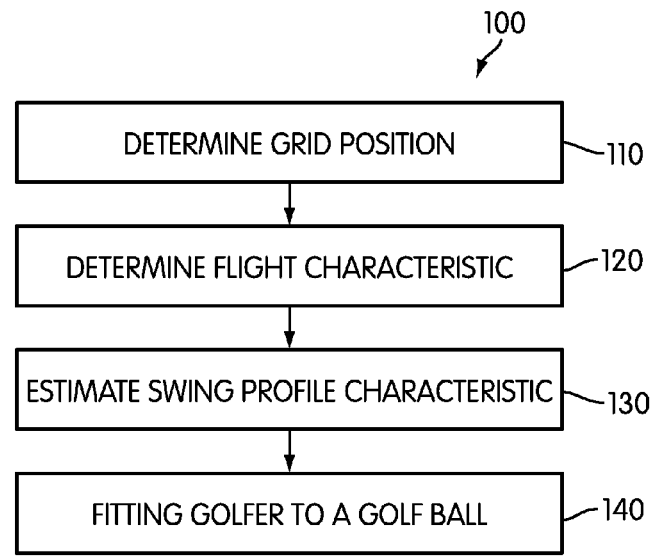
FIG. 1 a flow diagram of the overall process for the method and system for golf ball fitting analysis according to the present invention.
FIG. 2 is a table containing the parameters for grading or profiling golf balls in a test group.

An overview of the golf ball fitting analysis method of the present invention is shown in FIG. 1. The invention provides a system and method for using the flight pattern of a ball hit by a human golfer to determine various swing parameters. In sum, the present invention may provide golf ball recommendations correlating to ball fit values calculated using objective criteria obtained by correlating a grid position of a ball hit toward a grid to one or more flight characteristics of the ball. In turn, this information is correlated to one of more swing characteristics of the golfer, such as in a computerized system or with a table.

The general method of ball fitting 100 contemplated herein is to have a golfer hit a ball toward a grid. In a first step 110, the position of the ball striking or passing through the grid is determined. In an optional second step 120, the grid position determined in first step 110 is correlated to one or more flight characteristics, such as by using a look-up table stored in the memory of a computer, having a user manually consult a look-up table, putting the information into an algorithm, or the like. In a third step 130, a swing profile characteristic is estimated from either the flight characteristic determined in second step 120 or directly from the grid position, similarly to how a flight characteristic may be determined from grid position. In a fourth step 140, the swing profile characteristic is provided to a golf ball fitting system and a golf ball is selected for a golfer. Each of these steps is described with additional detail herein.

The ball fit values may be based on any type of scale or fit system. In some embodiments, the ball fit values may be a construct based on a one to five scale devised to quantify how difficult or easy a golf ball is to play. This one to five scale is shown in FIG. 2 along with various selected parameters for golf balls: driver spin, consistency of swing, side spin, attack angle and launch angle. These parameters are objective and are easily measured as detailed later in the specification. This scale ranging from one being more difficult to play and five being easier to play may be used throughout to quantify the objective criteria to the extent possible.

The courses most often played and the course to be played are not necessarily subject to grading or scaling, but may be used as additional parameters for golf ball fitting. It is contemplated that a golf course database could be created containing course climate and altitude conditions with a lookup to real time weather conditions using an Internet weather website integrated into the golf course database as another input into the golf ball fitting method. Since climate, altitude and weather conditions may be factors in how a golf ball plays, golf ball recommendations that take these into account may be integrated with present system and method. This may also be useful for golfers who are traveling to play courses with which they are unfamiliar. For example if a golfer's home course is in Ohio but travel calls for playing in a higher elevation like Denver, an adjusted golf ball recommendation may be in order. Similarly, if a golfer's home courses are in a rainy, humid climate such as Houston, but travel calls for playing in an arid climate like Tucson, an adjusted golf ball recommendation may be in order. This adjustment could be a separate output that is triggered only when a course to be played is input or requested.

Ball choice may also differ for the type of clubs used. For example, with a wedge, a low handicap golfer may prefer more spin since such an advanced golfer may be able to control their swing to impart the spin they want. Therefore a preference for high spin from a wedge would correlate to a golf ball that is more difficult to play and rated a one or closer to one on the scale of the present invention. Another example of applying the scale may be in the ball flight for the driver/woods and irons in which an advanced golfer may prefer a more workable ball while a high handicap golfer may prefer a straighter flight ball. This goes to the level of control they have so that a more workable preference for ball flight may a more difficult ball to play and therefore a one or closer to a one on the scale.

The ball fit may be correlated to the ball profiles of a test group of balls. The ball profiles or grades may also be calculated using the same one to five scale of difficulty as shown in the table in FIG. 2.

In the present method golf balls are graded or profiled using one or more of the five categories as shown in the table in FIG. 2. While an understanding of these parameters is well within the purview of a person of ordinary skill in the art, a short explanation of each is provided herein for completeness.

Driver spin refers to backspin and sidespin imparted to the ball at impact. Driver spin may also be considered "total spin", while backspin is the rotation of the ball opposite to the direction of flight and sidespin is any rotation of a ball other than backspin. High backspin golf balls may be designed to produce a lot of ball spin while in the air. A high backspin ball may produce a longer carry due to the backspin at impact, and may not get much run on the fairways. However, a high backspin ball may be advantageous on the greens as it may provide a proficient golfer a little more control because they may know how to strike the ball to impart the spin they want. High backspin balls may generally be used by lower handicap players to take advantage of these characteristics. On the other end of the spectrum are low backspin golf balls that may be specifically designed to minimize the amount of spin as it travels through the air. These low backspin balls may help eliminate sidespin, which means the backspin may minimize the chances of slicing or hooking the ball. A low backspin ball may tend to fly straighter through the air, but may not travel as far as a high spin ball. This may be compensated somewhat when the ball hits the ground as it will roll further and not spin back. Low backspin balls may be designed for higher handicap players as they may enable a straighter shot in the air and also run out on the fairways. Mid spin golf balls may fill the gap between the high and low spin balls and may be designed to optimize both feel and distance. Golfers with mid range handicaps may find these balls offer the right compromise between distance and control. In the context of spin, as seen in FIG. 2, golfers may refer to balls as hard to play or easy to play based on how easy it is to impart a spin on the ball. High spin balls may generally be considered more difficult to play and low spin balls may be considered easier to play.

The consistency of swing parameter simply refers to whether a ball requires a player's swing to be very consistent to impart the same flight and control, or whether a ball is more forgiving of a player's lack of swing consistency.

The side spin parameter may be tied to the driver spin parameter in that the same characteristics of a golf ball may be in play. A high spin ball may be easier to impart a side spin to, which means the chances of slicing or hooking the ball may be increased. A low spin ball may be designed to be less easy to spin and therefore may be more forgiving of a sliced or hooked strike.

The angle of attack represents the angle of the club head's path as it travels toward, and then makes contact with, the golf ball. The angle of attack may be determined by the golfer's swing mechanics. As a reference point most golf instruction refers to a zero angle of attack as meaning that the club head is traveling level with the ground at impact. This is sometimes called a sweeping angle of attack. A golfer's swing may be much more likely to produce a positive angle of attack, that is, traveling below the ball and moving up through impact, or a negative angle of attack, that is, coming down at the golf ball and moving below the ball after impact. Therefore a "flatter" swing may generally improve both distance and accuracy with a driver. A shallow angle of attack may result in a more solidly hit ball with less spin producing a longer and straighter shot. Divots may be one way golfers review their angles of attack when hitting with their irons, since a golfer who hits with a shallow angle of attack may generally leave shallow divots while a golfer who hits with a steeper angle of attack may generally leave deeper divots. Proficient players such as Tour players may generally have a shallow angle of attack, and higher handicap players may generally have a steeper angle of attack. Golf balls may be designed to help compensate for these swing mechanics as shown in the range in FIG. 2.

Launch conditions refer to how the ball comes off of the clubface at impact. For distance, there may be three launch conditions that matter: (i) how fast the ball is going, the initial velocity, (ii) how much backspin it has, the driver spin rate; and (iii) its angle upward, the launch angle. The initial velocity may depend on club head speed, which may depend on swing mechanics to some degree and the golfer's strength to some degree. Research has shown that for a given club head speed, there may be an optimal driver spin rate and launch angle to maximize distance. Distance may increase with higher launch angle and less backspin. Launch angle may be measured in degrees above the horizontal, and referring to FIG. 2, a ball that is designed to loft higher at impact may be considered a ball that is easier to play than a ball that has a low launch angle for given strike.

Using these parameters, the balls in a test group may be rated or graded using the one to five scale as shown in FIG. 2.

Figure 3A:
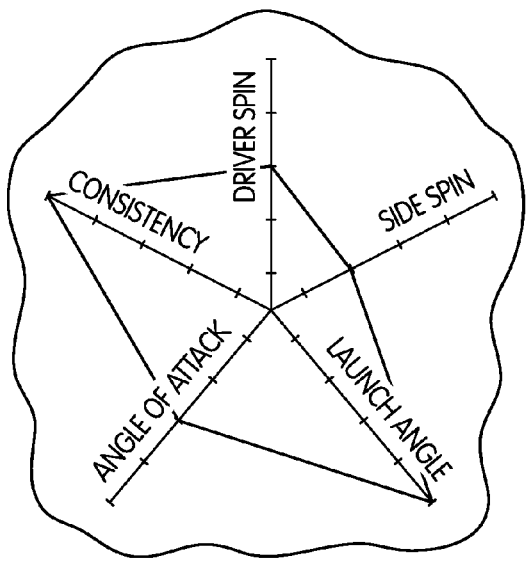
FIG. 3A is a graphical representation of the profile of Ball A in the test group graded according to the table in FIG. 2.
Figure 3B:
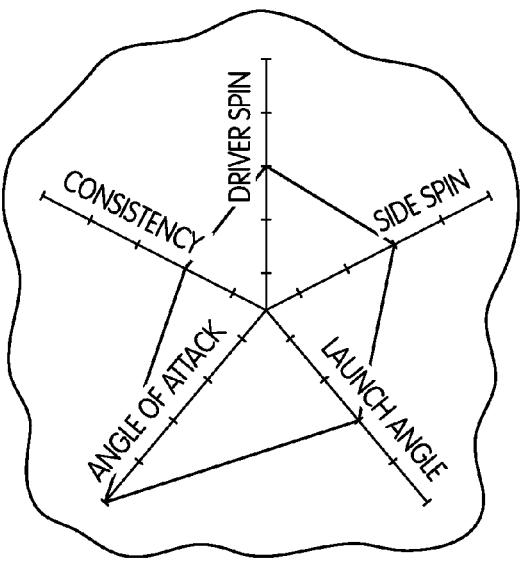
FIG. 3B is a graphical representation of the profile of Ball B in the test group graded according to the table in FIG. 2.
Figure 3C:
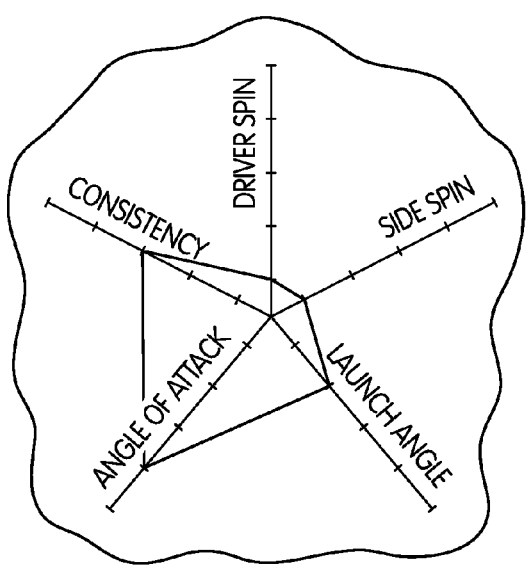
FIG. 3C is a graphical representation of the profile of Ball C in the test group graded according to the table in FIG. 2.

For convenience this application will assume that three balls are in the test group: Ball A, Ball B, and Ball C, and that each has a different profile. The profiles for the test group using these five parameters are shown graphically in FIGS. 3A, 3B, and 3C respectively as they may be displayed on a computer monitor. The wavy boundary around each profile is intended to depict that the graphic is on a portion of a computer display.

A database may be created using swing data from a series of tests. A mechanical ball-striking mechanism such as a robot golfer may be used to strike various golf balls with an assortment of golf clubs. Such swing robots are well-known in the art and any type could be used. Settings such as ball type, club type, attack angle, and club head speed, among others, may be entered before having the robot golfer strike the ball.

The information obtained from the tests using a robot golfer may either be input into a database or auto-populated from the measurement devices relaying the measurements to the computer directly in order to calculate a ball fit value based on the objective criteria. The database may be stored on any one or combination of computer readable media.

Figure 5:
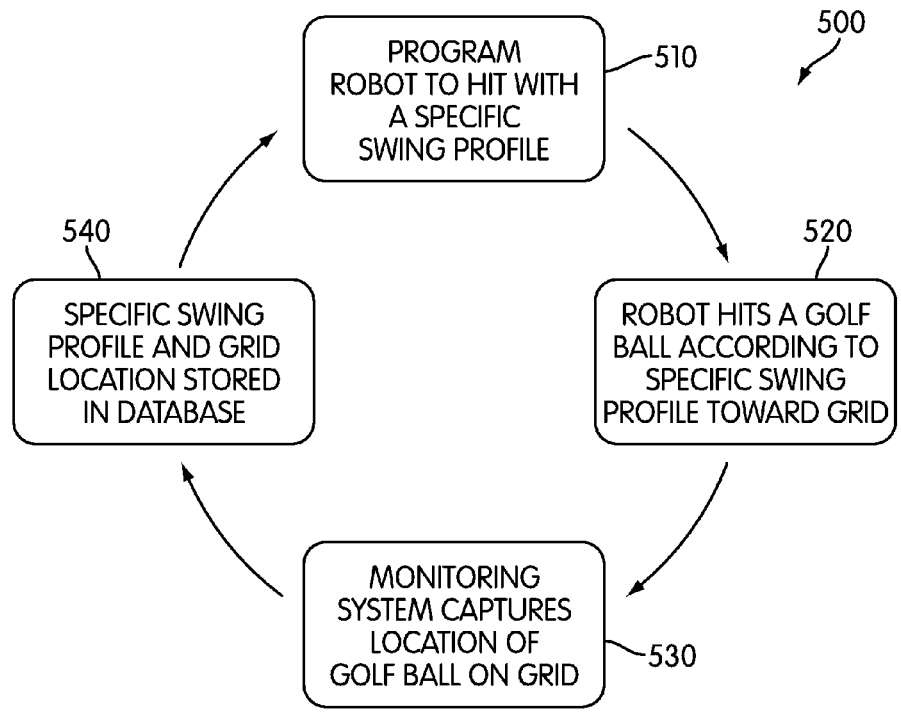
FIG. 5 is a flow chart describing one embodiment of how a correlation database can be developed.

One method of creating this database is shown in FIG. 5. The database may be iteratively created by repeating this method 500 with any number of programmed strikes. In a first database creation step 510, a user programs the robot to hit the ball with a first specific swing profile. The first specific swing profile may include such characteristics as angle of attack and swing speed, among other known swing characteristics. In a second database creation step 520, the robot then hits the golf ball according to the first specific swing profile toward the grid. In a third database creation step 530, the monitoring system captures the location of the golf ball on the grid. In a fourth database creation step 540, the first specific swing profile and corresponding grid location are stored in the database. This process may be repeated with a second specific swing profile, a third specific profile, and so forth to an nth specific profile. The greater number of swing profiles, the more accurate the database becomes.

As those of skill in the art may recognize, different combinations of swing profile characteristics may result in the same or similar grid location. Therefore, one possible set of iterations in building the database may be to hold one swing profile characteristic constant while cycling through various combinations of other swing profile characteristics. This data may then be analyzed to determine which particular swing profile characteristics are dominating a particular swing in terms of the grid location. Alternatively, each grid location may correspond to a golfer type, where that golfer type is considered somewhat independently of specific swing profile characteristics. The golf ball fitting system may assume that any golfer with a particular golfer type as determined by the grid location of their hit balls may find the same type of ball appropriate. The ball fitting system may thus suggest a ball or group of balls based on the golfer type.

After the database has been created, golfers may be tested by using one or more of the same combinations of golf clubs and golf balls as used in creating the database. The same methods of determining one or more of ball speed, trajectory, and spin as described above may be used with the golfer being tested. If such information is included in the database, one or more of the temperature, relative humidity, and other environmental conditions present while testing the golfer may also be recorded.

The golfer may use the same club(s) and golf ball(s) as used in the tests with the robot golfer, while in other embodiments, the golfer may use the club and ball with which the golfer typically plays. The information on which golf ball and club being used on each shot may be input to the system for improved accuracy.

In addition to grid location, a variety of strike results such as ball speed, ball trajectory, ball spin, distance and position of the ball at first contact with the ground, and the ball's final resting position can be measured. In order to produce consistent results, it may be preferred to perform tests at an indoor driving range to minimize the effect of wind on the flight of the ball. An indoor range may also permit parameters such as temperature and humidity to be varied as additional performance variables by using environmental controls, such as HVAC systems, humidifiers, dehumidifiers, or the like.

While information such as distance and position of the ball at first contact with the ground and the ball's final resting position may be easily determined by means such as the ball leaving a mark where it hits the ground and measuring the ball's final resting position, ball speed, ball trajectory, and ball spin may not be so easily determined.

A grid, whether virtual or physical, located in the flight path of a driven golf ball may be used in determining a driven golf ball's flight characteristics. Knowing the distance from the grid at which the ball is driven, and the location where the ball penetrates or strikes a grid, provides information that may be used to determine the characteristics of a golfer's swing.

Figure 4:
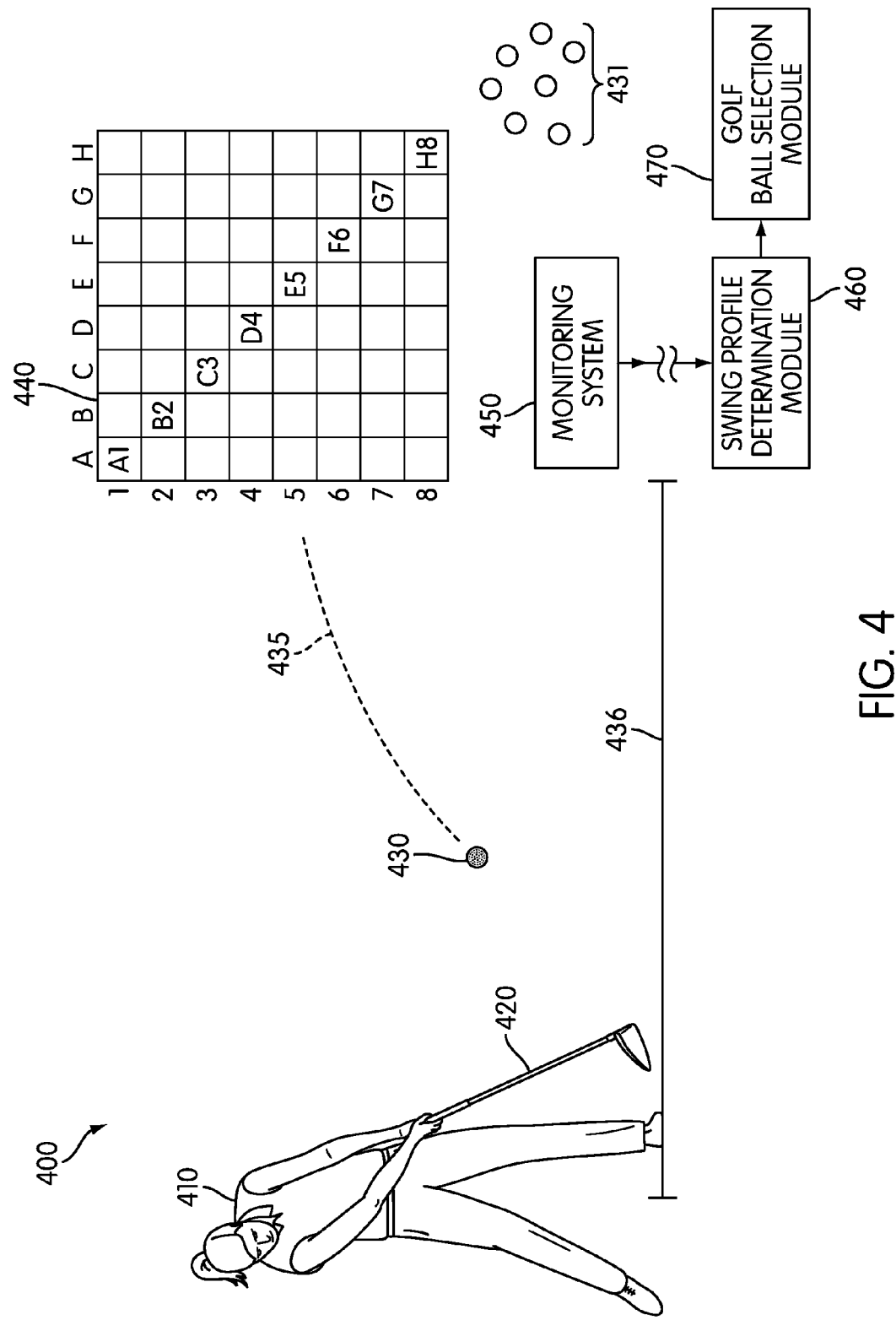
FIG. 4 shows an exemplary grid system used to determine characteristics of a golfer's swing.

FIG. 4 shows an exemplary grid system 400 used to determine characteristics of a golfer's swing. A golfer 410 may use golf club 420 to drive golf ball 430 toward grid 440 on a trajectory 435 from a known distance 436. In this embodiment, golf balls 431 have previously been driven through grid 440. In other embodiments, golf balls 431 may be captured by grid 440. A straight line drawn from where the ball is hit to where it passes through the grid provides an approximate trajectory of the golf ball. A ball with a hook or slice would affect the accuracy of the trajectory determined by using only two points—the tee and the place where the ball goes through the grid. The natural parabolic arc due to gravitational effects may also be a factor, so that the closer to the tee the grid is, the closer the measured trajectory is to the launch angle. However, the closer the grid is to the tee, the more difficult it is to get a good reading of the direction of flight in a horizontal plane. More than one virtual or actual grid in series may be used to increase the accuracy of the flight path determined by this method. One would be closer to the tee and one farther from the tee.

Monitoring system 450 may record where golf ball 430 goes through grid 440 after being driven. Monitoring system 450 may be any type of system that can be used to determine the grid location of golf ball 431. In some embodiments, monitoring system 450 may be a still or video camera that can capture visual images in any part of the light spectrum. Cameras, with or without strobe, may be used to determine the trajectory of a ball. Cameras may also be used to determine spin on a driven golf ball.

In some embodiments, monitoring system 450 may include a computer capable of detecting and interpreting sensor impacts, such as pressure sensors or light receivers. In some embodiments, monitoring system 450 may also include an observer with a sheet, PDA, or other recording device where the observer watches to see which grid location a golfer hits to, then notes the location on the recording device.

Once monitoring system 450 determines a strike location or pass-through location on grid 440, also referred to as a ball's "grid location", monitoring system 450 communicates that grid location to a swing profile determination module 460. In some embodiments, swing profile determination module 460 may be a computer program, algorithm, database, lookup table, or the like that correlates the grid location to an estimated swing profile. In other embodiments, swing profile determination module may be a book or table that a user may use to correlate the grid location to an estimated swing profile.

Grid 440 may have letters defining horizontal dimensions on the grid and numbers defining vertical dimensions on the grid, or vice versa. Knowing the grid location is an important step in determining flight characteristics and swing profile characteristics for use in a ball fitting system. For example the grid location directly underneath the letter "B" and to the right of number 2 in FIG. 4 may be defined as grid location "B2". Any means known in the art of identifying and labeling grid locations may be used.

Figure 4A:
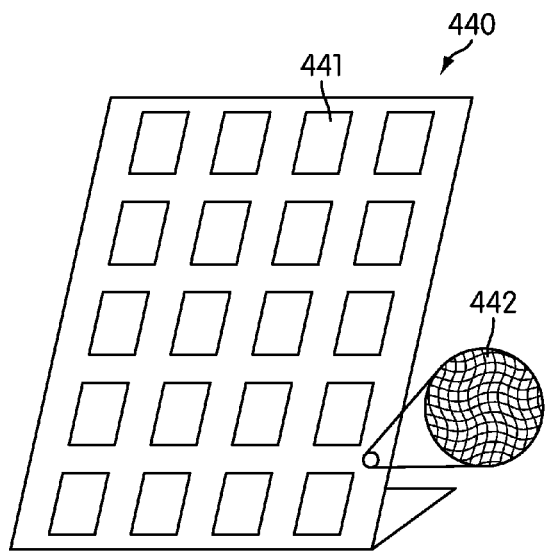
FIG. 4A shows another embodiment of a grid for use in the grid system of FIG. 4.
Figure 4B:
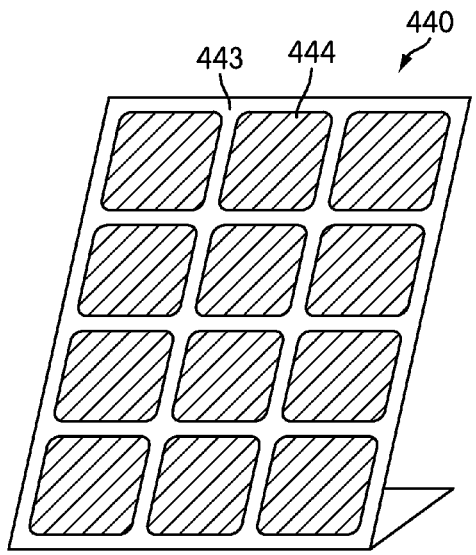
FIG. 4B shows another embodiment of a grid for use in the grid system of FIG. 4.

Grid 440 may take any number of forms as long as grid 440 is capable of allowing a user or automated system determine the grid location of golf ball 430 on grid 440. Several embodiments of grid 440 are shown in FIGS. 4A-4D. In some embodiments, grid 440 may be a mesh 441, such as is shown in FIG. 4A. Mesh 441 may be attached to a stand or attached to landscape elements with ropes or cords. Mesh 441 may be made of a flexible material, such as a woven material 442 or a nonwoven material (not shown). Such a system has the advantages of low cost and simplicity. One drawback of such a grid may be that the grid may lack a sufficient number of holes in the mesh to form a fine enough grid to locate the ball accurately, in that the physical grid is more likely to interfere with the flight of the ball, affecting where it lands and, thus, the accuracy of the measurements.

Other physical grids may be used. For example, another type of physical grid may be a solid surface with an adhesive or foam that causes the golf balls to stick to the surface upon contact. Yet another type of physical grid may include a rigid frame with frangible panels that are broken when a golf ball passes through the panel. In another embodiment, the frangible panels may break away from the rigid panel, but may otherwise remain intact when the golf ball impacts the frame. In some embodiments, such as the embodiment shown in FIG. 4B, grid 440 may be a stand made of a relatively inflexible, rigid material, such as metal or PVC pipe, which is formed into a frame 443. Frame 443 defines various openings into which panels 444 may be positioned. Panels 444 may be made from any material, such as a frangible material that can be punctured by golf ball 430 to leave a visible mark of the grid location. Similarly, panels 444 may be made from a material that is readily marked by impact, such as pressure-sensitive paper or film. Panels 444 may be sensor-rich and include pressure sensors calibrated to detect the impact of golf ball 430. Panels 444 may be attached to frame 443 using any method known in the art, such as with an adhesive, mechanical fasteners, or the like. Panels 444 may be rigid members hingedly attached to frame 443, where hinges may include sensors to indicate when a particular panel is moved by an impact with golf ball 430.

Figure 4C:
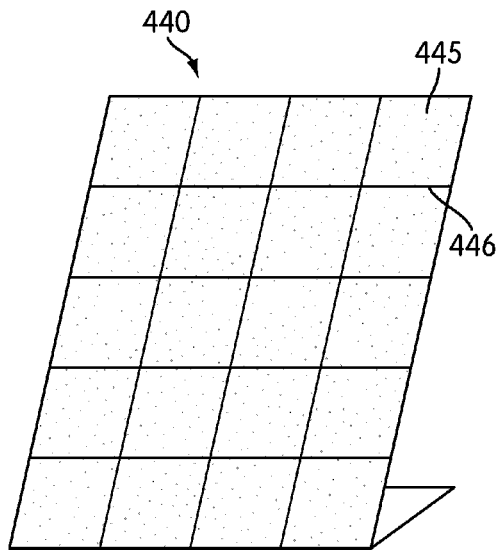
FIG. 4C shows another embodiment of a grid for use in the grid system of FIG. 4.

In another embodiment, shown in FIG. 4C, grid 440 may be a single panel 445 of a material capable of capturing golf ball 430, such as a deformable foam. In some embodiments, panel 445 may include delineations 446 describing a grid pattern. Delineations 446 may be disposed on panel 445 using ay method known in the art, such as by painting, with an adhesive, carving, embossing, or the like. In some embodiments, the material of panel 445 may be sufficiently deformable to capture golf ball 430 without breaking from the high velocity impact of golf ball 430. In other embodiments, the material of panel 445 may break to indicate the grid location of golf ball 430.

Figure 4D:
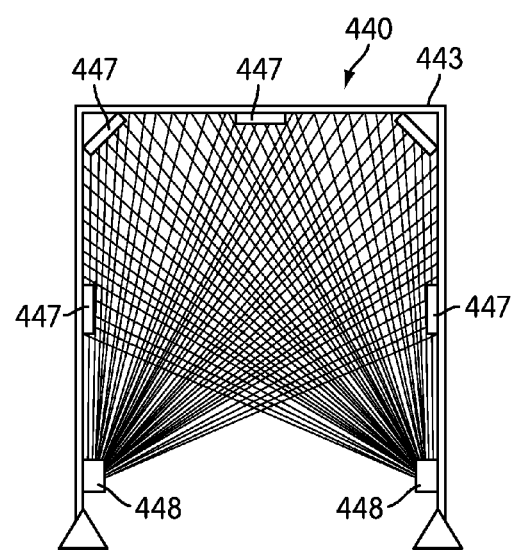
FIG. 4D shows another embodiment of a grid for use in the grid system of FIG. 4.

FIG. 4D shows an embodiment of grid 440 where a virtual grid may be set up using optical detectors/transceivers 447, 448, including lasers, pointing both parallel to the ground and perpendicular to the ground. Optical detectors and transceivers 447, 448 may be attached to a frame 443 made of a rigid material that can support optical detectors and transceivers 447, 448 at known spatial separations. Golf ball 430 passing through the virtual grid may interrupt the light beams, providing a grid location. This information may provide an approximate trajectory of the struck ball. The distance of the golfer from the grid may be varied or there may be more than one grid, with each grid located at a different distance from the golfer, to provide additional information on the ball's trajectory.

An example of a method of distance and direction measuring using reflected pulses of light is known in the art. Such a method may use an array of pulsing light transmitters and receivers. An object in the path of the transmitted light may be reflected by an object in the path of the light and reflected back to a receiver. The transit time of the light allows the system to calculate the distance between the transmitter/receiver and the detected object.

Light signals may be emitted from any of the light emitter/transceiver devices 447, 448. Reflected light from golf ball 430 may be returned to the light transceivers 447, 448. Distances of golf ball 430 from the transceivers may be determined from the return time of the reflected light. The interference pattern of the multiple light beams creates the virtual grid. Each transceiver may emit different frequencies of light to enhance the virtual grid effect.

An optical system including a plurality of arrayed photoelectric elements that receive light pulses reflected by objects in the detection fields may be used to form a virtual grid. A distance measuring device determines the distance from the system to an object and the corresponding direction in which the object lies in accordance with the delay between a drive signal and reception of the corresponding reflected light pulses by the individual photoelectric elements. The system may be used to determine where a golf ball passes through a virtual grid.

Sonic detectors may also form a virtual grid, locating where a golf ball passes through the grid by sound from an emitter being reflected back to a receiver located near the emitter. As with the light systems described above, the distance to the golf ball may be determined by the amount of time it takes sound to reflect back from the golf ball. Similar to the optical system shown in FIG. 4D, two such devices mounted approximately perpendicular to each other can be used to determine the location of the golf ball.

Another system may use multiple sound detectors located at various places to determine the location on a screen struck by a driven golf ball. The location is determined by the timing of the sound of the ball striking the screen reaching each detector. Any three sound detector time differentials can be used to determine the location of the strike by the golf ball.

A backstop with sensors on the edges can be used to determine the location of a driven ball striking a grid. Where a driven golf ball strikes the backstop can be determined by the order and timing of the sensors being affected by the pressure the driven golf ball exerts on the backstop.

A grid made of parallel spaced apart conductors in one plane positioned ahead of a second group of conductors in a second plane parallel to the first plane may be used to determine where a driven golf ball strikes a grid. When the grid is struck by a driven golf ball, a conductor in one group contacts a conductor in the other group to complete a circuit and provide an accurate measurement of the direction and velocity of a golf shot.

Another method of determining impact location of a driven golf ball may use a net defining the grid parallel to the plane defined by the detectors located between a tee and a net. Sensors may be located at each corner of the net. The sensors may produce a voltage signal indicative of the amount of force applied by a ball to the net. The difference in voltage signals among the four sensors may be used to determine the location where the driven golf ball strikes the net.

To determine the speed of a struck golf ball, a system of determining the time it takes for a golf ball to reach a grid may be measured. The distance to the grid from the tee, a predetermined quantity, may be divided by the time to determine an average speed of the golf ball to the grid. Unless the grid is spherical with its center located at the tee, corrections must be made for the distance to the particular coordinates where the ball reaches the grid. Alternatively, a ball passing a sensor between a tee and a grid may start a timer, with the distance between a plane defining the sensor and a plane defining a grid being divided between the time it takes the ball to reach the grid after passing the sensor to obtain ball speed.

Speed of a driven golf ball may also be determined by the same sort of meters used to detect speeding cars or time baseball pitchers. More than one meter may be located in various places in the driving range to detect speed and direction in several planes.

A variety of ways to determine when a golf ball is struck may be used to start a timer. In some embodiments, the time of the ball being struck may be determined acoustically or optically. The time the ball reaches a grid may be determined by the same means used to determine the location where a ball passes through a grid.

One method of determining when a ball is struck uses detection of the sound of a club impacting a ball by a microphone, which triggers a counter. The time the ball takes to reach a grid from the tee is used to determine the speed and approximate trajectory of the ball.

Determining when a ball is struck using optical methods may involve light beams being crossed by a ball or a club. A pair of sensors located between a tee and a grid may be used to determine the flight path of a driven golf ball. The sensors may define a plane perpendicular to the ground. The velocity of the ball may be calculated from the time it takes the ball to pass from the plane defined by the sensors to a second plane parallel to the plane defined by the sensors.

In some embodiments, spin of a driven golf ball may also be determined. Spin may be determined by optical methods or any other method known in the art for determining spin of a golf ball such as using a typical camera monitor. Spin may include backspin and/or sidespin. Some methods determine spin of a driven golf ball using a light source, multiple light sensing devices and a ball with reflective facets.

The information obtained from a golfer being tested—one or more of ball speed, ball spin, ball trajectory—may be entered into a computer and matched to information in the database within a tolerance range. From that information, a person or automated system fitting a golfer with the appropriate golf ball may determine one or more of the following swing parameters of the golfer being tested: club head speed, ball speed, launch angle, attack angle, backspin, sidespin, and total distance. Those parameters may be used to determine the best golf ball for the golfer.

For convenience in this description, the test group of balls consists of three: Ball A, Ball B, and Ball C. The profiles of these balls based on the one to five scale shown in FIG. 2 is also graphically represented in FIGS. 3A, 3B, and 3C respectively, with zero being the center of the five axes. As seen in the figures, the graphing of the parameters in this fashion may provide a unique shape and potential identifier for the balls. A ball performance profile that is unique using this scale can be likened to a fingerprint or a ball fit print.

Figure 3D:
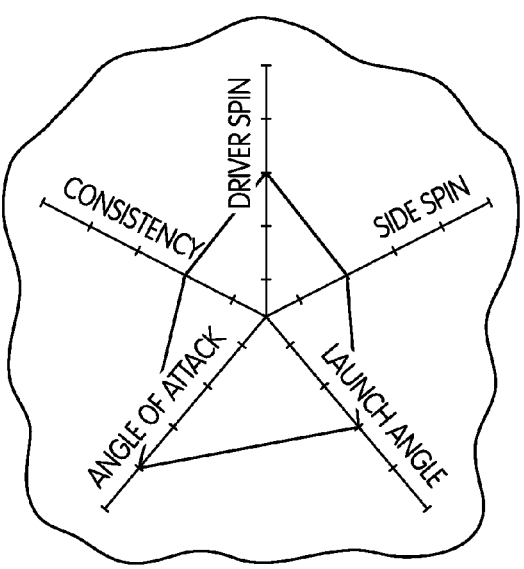
FIG. 3D is a graphical representation of a golfer's swing data.

In one embodiment, one way to display to the golfer the results of the ball fitting method may be using the graphical representation of their swing test as seen in FIG. 3D and show the correlation to the test group of balls. In this instance, if these ball fit prints were displayed together or in overlapping fashion on a computer display it may be easily seen that Ball B, FIG. 3B, has the closest shape to the ball fit print of the golfer, FIG. 3D. This may visually demonstrate to the golfer in an easily understood manner why Ball B is the recommended ball for their swing as measured using objective criteria. Such graphing of a golfer's swing data could also serve as an instructional aide to show the areas for improvement in their swing and game.

Of course other graphical representations are also possible and completely within the purview of this invention. For example the five parameters could be graphed by bars and a golfer's swing also graphed with bars so show a match or closeness of match with a ball profile. Although five parameters are shown and discussed in detail in this application, it is also contemplated that fewer than five or more than five parameters could be used to calculate a ball fit value and graphically represent the results. Also, even though the scale discussed in detail is a numerical range from one to five, it is also within the scope of the invention to modify the scale to have fewer or greater gradations, or a different numerical range. Alternatively the scale could be an alphabetical scale, a color scale or other type of scale and is not limited to a numerical scale. The invention pertains to quantifying subjective criterion and may be done by experts or those with knowledge and storing those results.

Figure 7:
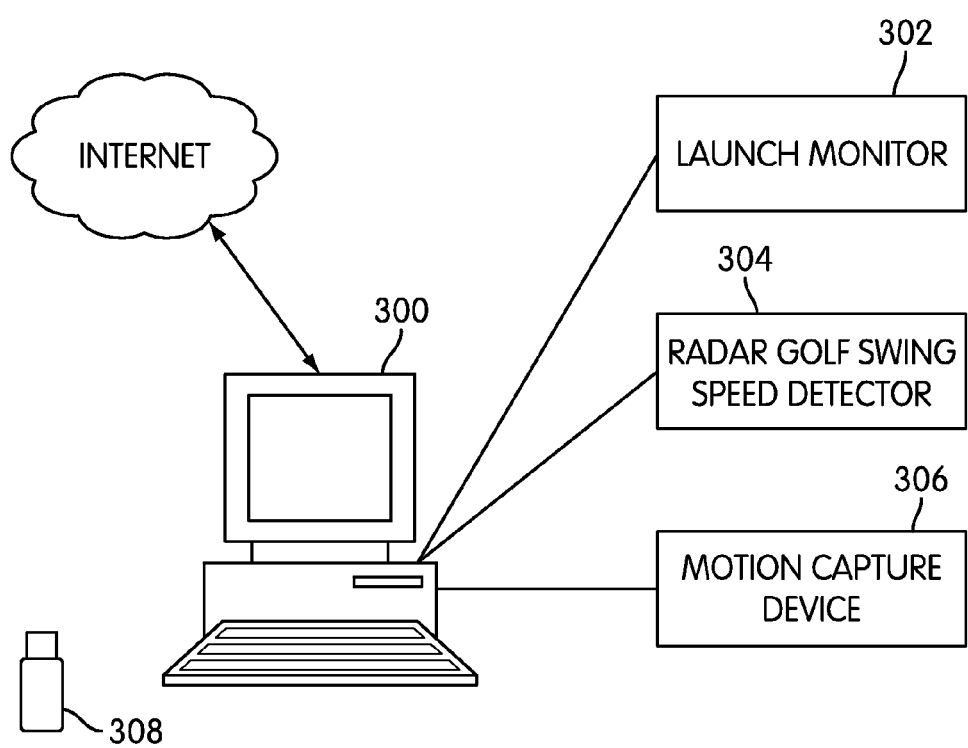
FIG. 7 is a schematic diagram of a system for golf ball fitting analysis.

As shown in FIG. 7, the system may include a computer 800 running software to collect the inputs and perform the calculations discussed herein. Computer 800 may be functionally connected via hardwire or wirelessly, to various measurement devices such as a launch monitor 802, a radar swing speed detector 804, a motion capture device 806 or any number of such devices. Even putting monitors could be used to capture the attack angle of the club and launch angle. Various other optical, photographic, infrared, ferro-magnetic or laser sensors or measuring devices are all contemplated to be used to collect the objective data of the golfer.

While the software for the current method could be run on a standalone general purpose computer 800, it is also contemplated that computer 600 could be a server or connected to the Internet could be the terminal to use the method online or remotely from where the software resides or is hosted. The computer may also include a keyboard, a mouse, and a monitor controlled by a display card. The computer also may include a hard disk or other fixed, high density media drive, and a removable media device drive into which a removable magneto-optical media such as a disk is inserted and read and/or written to. These discrete components are connected using an appropriate device bus. The computer may also be connected to a printer (not shown) to provide printed listings of any of the inputs, intermediate calculations, and outputs associated with the estimated option price. Examples of computer readable media present in the system illustrated in FIG. 7 include the memory, the hard disk, and the removable media. Stored on any one or a combination of computer readable media, the present invention may include software for controlling the hardware of the computer and for enabling the computer to interact with a user. The software may include, but is not limited to, device drivers, operating systems and user applications. Computer readable media further includes the computer program product of the present invention for calculating an estimated option price. It is also contemplated that a removable media device such as flash memory 808 could be used with computer 800 to store a golfer's inputs and information. This would enable a golfer to reevaluate after some time has lapsed to determine how their game has changed over time. This would also enable a golfer to prepare to play in a different location with different altitude and climate by changing only those inputs to their stored data. This would also enable portability of their information in case of travel or relocation.

Although the removable memory is illustrated as flash memory, other types of media such as magnetic devices, optical devices, and the like are also within the scope of the invention.

It is also contemplated that this method could be part of a broader athlete data storage, analysis and retrieval system in which their vital statistics and game statistics are stored for review or analysis by various programs, and to recommend new equipment suited to their game. Such programs or data could be run on hand held devices as smart phones or other personal computing devices, with the possibility of sharing the data by users who have given each other authorization to view the data. Safeguards for privacy are also contemplated to be within the purview of this invention.

While the above description of the system has focused on an exclusively objective method of fitting a golfer with a golf ball, the method may be combined with methods using subjective methods of fitting a golf ball. For example, U.S. Patent Application Publication Number 2011/0009215, currently U.S. patent application Ser. No. 12/498,364, filed on Jul. 7, 2009 and published on Jan. 13, 2011, and entitled "Method and System for Golf Ball Fitting Analysis", which is incorporated herein in its entirety by reference, discloses a method combining subjective and objective methods of fitting a golfer with a golf ball. The method described herein may be used as the objective component in a system such as the one disclosed in the '364 Application.

Figure 6:
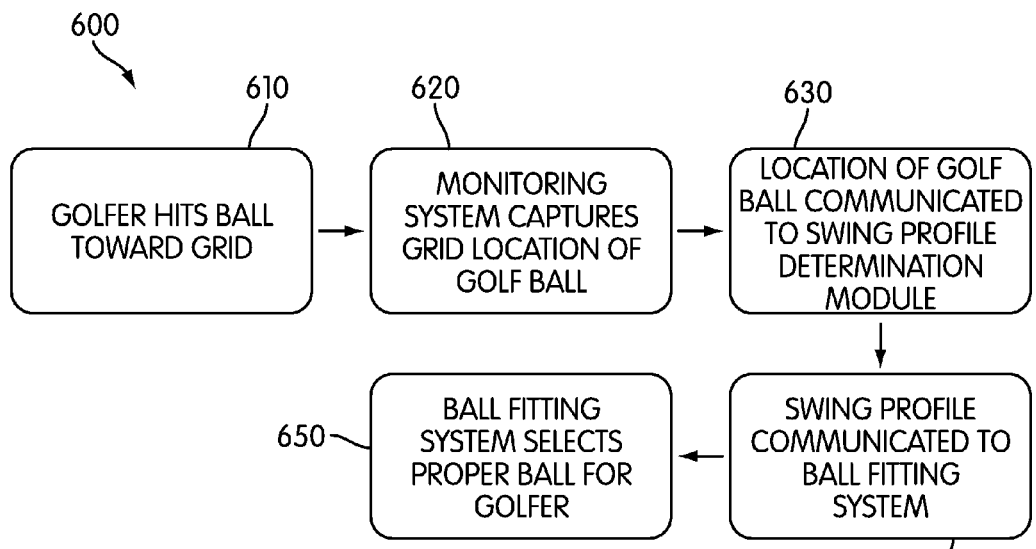
FIG. 6 is a flow chart describing an embodiment of a method of using a grid system for ball fitting such as the grid system shown in FIG. 4.

FIG. 6 shows one embodiment of a method 600 of using the grid system as part of a ball fitting system. In the embodiment shown in FIG. 6, the golfer hits a ball toward the grid in a first grid use step 610. In a second grid use step 620, the monitoring system captures the grid location of the golf ball. In a third grid use step 630, the golf ball's grid location is then communicated to the swing profile determination module. The swing profile determination module estimates or otherwise determines one or more swing profile characteristics of the golfer, such as by accessing a database that contains information that correlates grid location with one or more swing profile characteristic. In a fourth grid use step 640, the one or more swing profile characteristic is then communicated to a ball fitting system. In a fifth grid use step 650, the ball fitting system selects a best-fit ball for a golfer or a group of appropriate or proper ball choices for a golfer.

In other embodiments, the manner or order of any of these steps may be varied. In some embodiments, various steps may be omitted. For example, if the grid location is assumed to correspond to a golfer type, the swing profile determination module steps may be eliminated, and the grid location itself may be directly communicated to the ball fitting system.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

I claim:

1. A method for determining a golf ball fit value, the method comprising the steps of:
    determining a grid position of a golf ball hit by a golfer toward a physical grid comprising a single plane intersecting a flight path of the golf ball, wherein the grid position corresponds to a location of the golf ball as it passes through the physical grid, wherein the physical grid comprises a plurality of rigid members disposed across the physical grid in an intersecting manner, the plurality of rigid members configured to hold a plurality of frangible panels;
    determining at least one flight characteristic of the golf ball by correlating the grid position where the golf ball passes through the physical grid to the at least one flight characteristic of the golf ball using a look-up table stored in the memory of a computerized system;
    estimating at least one swing profile characteristic of the golfer using the at least one flight characteristic of the golf ball;
    fitting the golfer to a golf ball using the at least one swing profile characteristic,
    wherein the at least one swing profile characteristic includes one or more of club head speed, launch angle, and attack angle, and
    the at least one flight characteristic includes one or more of ball speed, total ball spin, ball trajectory, and total distance.

2. The method of claim 1, wherein the step of estimating the at least one swing profile characteristic is performed by accessing a database of swing parameters corresponding to flight characteristics.

3. The method of claim 2, wherein the database is created by the steps of:
    directing a robot to swing a golf club to drive a golf ball toward the physical grid, wherein the robot is programmed to swing the golf club in a variety of combinations of swing profile characteristics; and
    collecting information on a grid location of the golf ball for each of the variety of combinations of swing parameters.

4. The method of claim 1, wherein the grid position corresponds to a visible mark on the physical grid at a location where the golf ball passes through the physical grid.

5. The method of claim 4, wherein the visible mark comprises at least one frangible panel that has been broken away from being held in place by the rigid members.

6. The method of claim 1, wherein each of the plurality of frangible panels comprises a frangible material and the grid position of the golf ball corresponds to a puncture in the frangible material.

7. A method of compiling a database for a system for fitting a golfer with a golf ball, wherein the database is compiled by the steps of:
    programming a robot to swing a golf club to drive a golf ball toward a physical grid in one of a variety of swing profiles, wherein the physical grid comprises a single plane intersecting a flight path of the golf ball, the grid further comprising a plurality of rigid members disposed across the grid in an intersecting manner, wherein the plurality of rigid members is configured to hold a plurality of frangible panels;
    directing the robot to hit the golf ball toward the grid;
    determining a grid position of the golf ball as the golf ball passes through the grid; and
    storing information on flight characteristics of the golf ball in the database corresponding to the variety of combinations of golf swing parameters and a corresponding grid position for each of the combinations of golf swing parameters,
    wherein the flight characteristics of a golf ball comprise one or more of ball speed, ball spin, ball trajectory, and total distance,
    wherein the parameters of a golfer's swing comprise one or more of club head speed, launch angle, and attack angle.

8. The method of claim 7, wherein the steps are repeated after programming the robot to swing the golf club to drive the golf ball toward the grid with a different swing profile of the variety of swing profiles.

9. The method of claim 8, wherein the variety of swing profiles includes a specified number of swing profiles and the process is repeated the specified number of swing profiles.

10. The method of claim 7, wherein the grid position corresponds to a visible mark on the grid at a location where the golf ball passes through the grid.

11. A golf ball fitting system comprising:
    a physical grid;
    a monitoring system;
    a swing profile determination module; and
    a golf ball selection module;
    wherein the physical grid comprises a single plane intersecting a flight path of a golf ball, the grid further comprising a plurality of rigid members disposed across the grid in an intersecting manner, wherein the plurality of rigid members is configured to hold a plurality of frangible panels; and
    wherein a grid position where the golf ball passes through the grid corresponds to at least one swing profile characteristic of a golfer.

12. The golf ball fitting system of claim 11, wherein each of the plurality of frangible panels comprises a frangible material and the grid position of the golf ball corresponds to a puncture in the frangible material.

13. The golf ball fitting system of claim 11, wherein the grid position corresponds to a visible mark on the grid at a location where the golf ball passes through the grid.

14. The golf ball fitting system of claim 11, wherein the monitoring system comprises an image capturing system.

15. The golf ball fitting system of claim 11, wherein the swing profile determination module includes a database correlating the grid position with the at least one swing profile characteristic.

16. The golf ball fitting system of claim 11, wherein the golf ball fitting system further comprises a database correlating the at least one swing profile characteristic with a golf ball.

* * * * *